March 19, 1968     P. E. GIES     3,374,015
METHOD OF COUPLING SHAFT TO ARM TO TRANSMIT TORQUE AND
MOMENT WHICH ARE NOT COPLANAR
Filed July 22, 1965
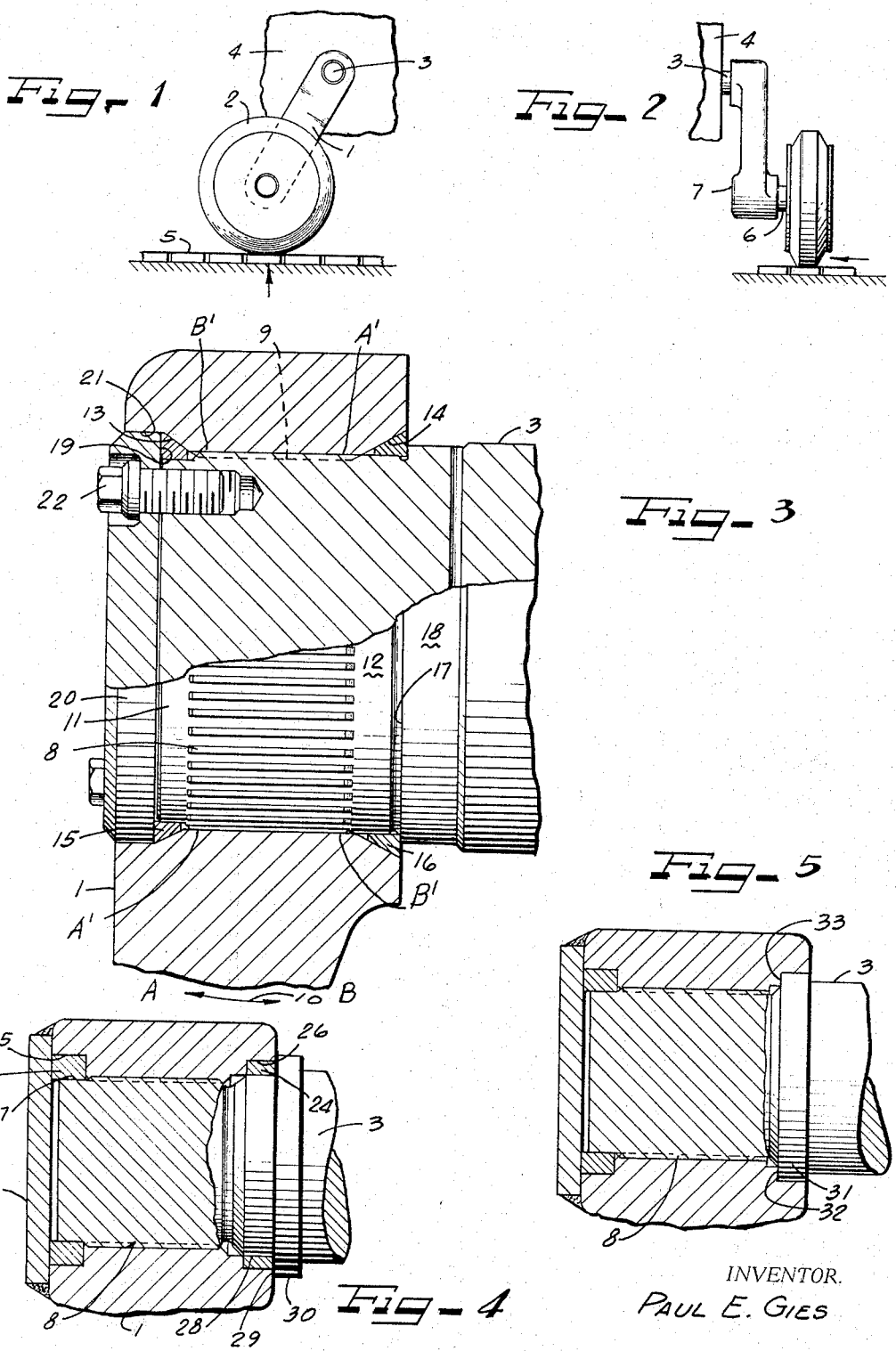
INVENTOR.
PAUL E. GIES

United States Patent Office 3,374,015
Patented Mar. 19, 1968

3,374,015
METHOD OF COUPLING SHAFT TO ARM TO TRANSMIT TORQUE AND MOMENT WHICH ARE NOT COPLANAR
Paul E. Gies, Amherst, N.Y., assignor to Houdaille Industries, Inc., Buffalo, N.Y., a corporation of Michigan
Filed July 22, 1965, Ser. No. 474,126
3 Claims. (Cl. 287—53)

ABSTRACT OF THE DISCLOSURE

A torque transmitting assembly having a shaft mounted for rotation which is splined to a torque arm at one end thereof and wherein first and second cylindrical rings are disposed at opposite edges of the splined shaft region to maintain the radial alignment between the shaft and externally fitted arm. A locking plate is bolted to the shaft and engages one of the cylindrical rings to hold the rings in position and thereby prevent peening of the splined surfaces due to the twisting or torqueing of the arm relative to the shaft.

---

This invention relates to a shaft-arm assembly and in particular to a method of transmitting non-coplanar torque and a moment without damaging the cooperating members.

In military tanks and various construction vehicles such as tracked crawler tractors and the like, means must be provided for supporting the tracked crawler treads intermediate the driving wheels. Furthermore, as these vehicles are intended to be used in a rough terrain, it is particularly important that such means be capable of sustaining appreciable torque at all planes to the axis of support.

Such a supporting means might take the form of a suspension unit having a shaft mounted for rotation and a road arm extending substantially perpendicular from the shaft to equalizer wheels positioned against the tracked crawler treads. The road arm may be splined or serrated to the shaft such that forces received at the road arm perpendicular to the shaft will result in a twisting of the shaft.

However, forces are also often received at the road arm which have a component parallel to the shaft axis. This force does not produce rotation of the shaft but rather tends to compress the splined or serrated surface. The result of this parallel force, which may be referred to as a moment or torque which is non-coplanar to the moment applied for rotating the shaft, is that the spline or serration surfaces tend to be ruptured or excessively worn. The only remedy is the replacement of the parts which is often difficult in field situations.

Since peening is a common result of this non-coplanar torque, attempts have been made at compensating for this flaw. Heretofore, however, such attempts have been directed at obtaining a tighter or a larger interference fit between the splined or serrated surfaces. The result has not been entirely successful in eliminating peening, and in addition, a tight fit develops which cannot be separated by ordinary mechanic's tools.

Therefore, it is an object of this invention to provide a shaft-arm assembly for effectively transmitting torque and moment which are not coplanar.

It is also an object of this invention to provide a shaft-arm assembly for transmitting non-coplanar torque and moment and which can be effectively disassembled by ordinary mechanic's tools.

It is another object of this invention to provide a shaft-arm assembly for transmitting non-coplanar torque and moment without peening of the cooperable splined or serrated surfaces.

It is a further object of this invention to provide a shaft-arm assembly utilizing tapered conical rings for absorbing non-coplanar torque and moment.

These and other objects, features and advantages of the present invention will be understood in greater detail from the following description and the associated drawings wherein reference numerals are utilized in designating a preferred embodiment and wherein:

FIGURE 1 is a front view of the shaft-arm assembly of this invention as found in a typical working environment;

FIGURE 2 is a side view of the shaft-arm assembly of FIGURE 1;

FIGURE 3 is an enlarged and partially sectioned view of the shaft-arm assembly utilized in FIGURES 1 and 2 for emphasizing the internal features thereof;

FIGURE 4 is a partially sectioned view of a shaft-arm assembly illustrating an alternate embodiment of the structure shown in FIGURE 3; and FIGURE 5 is a partially sectioned view of a shaft-arm assembly illustrating a second alternate embodiment of the features shown in FIGURE 3.

A typical working environment for this invention is shown in FIGURES 1 and 2 in the form of a tractor suspension system comprising generally a horizontal shaft rotatably mounted within a tractor body and a connecting road arm for supporting a stabilizer wheel against a moving tracked crawler tread. The nature of the connection intermediate the shaft and the road arm can be seen in FIGURE 3 as involving cooperably splined or serrated internal surfaces.

The function of the road arm and associated stabilizer wheel can best be understood from a consideration of the environmental circumstances encountered by a military tank, tractor or the like. In particular, the tracked crawler tread is peculiarly adapted to being operated in rough terrain, in that it is generally able to conform to irregularities in land surfaces. In so conforming, the tracked crawler tread will be distorted upwardly and downwardly from a normal plane of operation, and the stabilizer wheel will likewise be moved for pivoting the road arm about the horizontal shaft.

It is apparent therefore that the splined or serrated surfaces are required to transform the translational motion of the stabilizer wheel into a rotary motion of the connecting shaft. Any torque associated with this rotary movement is adequately sustained by the cooperable splined or serrated surfaces. However, torque which does not produce rotary motion of the connecting shaft is not adequately accommodated by the splined or serrated surfaces. For instance, due to the irregularity of the terrain, a force may be directed, as indicated by the arrow in FIGURE 2, which is parallel to the axis of the horizontal shaft and which does not result in a rotary motion of the connecting arm. The torque or moment resulting from this parallel force will tend to compress the surfaces intermediate the arm and shaft resulting in a peening of the splined or serrated regions. Continuous torquing in this manner characteristically results in a rupture or gradual erosion of the splined or serrated surfaces to the point where they are no longer capable of sustaining the rotary producing torque directed normal to the tracked crawler tread. This is the condition of general failure and accordingly the parts must be replaced.

The structures of FIGURES 3 through 5 however are provided with a means for absorbing this non-rotary producing torque thereby protecting the splined or serrated junctions. In these embodiments this means takes the form of cylindrical rings which are appropriately disposed and consrtucted for limiting compression of the spline or serration.

Referring to FIGURES 1 and 2 in greater detail, it can be seen that a road arm 1 connects a stabilizer wheel 2 and a horizontal shaft 3 which is rotatably mounted within and protruding from the tractor body 4. The wheel 2 bears against the upper surface of a tracked crawler tread 5 and is provided with an axle 6 rotatably received within a bearing sleeve 7 of the road arm 1.

This invention focuses upon the connection provided between the road arm 1 and the horizontal shaft 3 which may be understood by reference to the enlarged view of FIGURE 3. In FIGURE 3 the shaft 3 is seen to have a spline or serration 8 which is cooperable with a like surface 9 formed interiorly of the road arm 3 for rotatably locking the two members. It may be observed that torque applied to the road arm 1 in the directions indicated by the arrows 10 would result in compressing the splined or serrated surfaces for producing the abovementioned failure. In particular, torque directed as at A is resisted by forces in the spline area at A′, and torque directed as at B is resisted by forces in the spline area as at B′.

In this structure, however, the shaft 3 is provided with smooth continuous surfaces 11 and 12 formed inwardly and outwardly of the spline or serration 8. In addition, the road arm 1 is provided with tapered recesses 13 and 14 formed circumferentially, inwardly and outwardly, of the spline or serration 9 as to be adjacent to the smooth continuous surfaces 11 and 12. These adjacent surfaces then cooperate upon the introduction of tapered conical rings 15 and 16.

The rings 15 and 16 are disposed within the recesses 13 and 14 respectively such that motion of either ring inwardly of the road arm 1 will tend to protect the cooperable splines or serrations 8 and 9. In this manner, the rings 15 and 16 act as circumferential wedges between the shaft and arm surfaces. The final step to complete this structure therefore is to provide a means for assuring a continuous inward pressure on the tapered rings for accomplishing their wedge-like function.

Two features cooperate to produce a continuous inward pressure on the tapered conical rings 15 and 16. These are found in a shoulder 17 formed at a radially enlarged collar 18 of the shaft 3 and in a pressure surface 19 provided by a closure plate 20. In particular, the closure plate 20 consists of a wafer-shaped disk which is seated within a circumferential groove 21 formed at the outer face of the road arm 1 and which is fixedly secured to the end face of the shaft 3 by a series of connecting bolts 22.

It can be seen that by tightening the bolts 22 the pressure surface 19 is caused to move inwardly of the road arm 1 for compressing the tapered ring 15 within the associated recess 13. Also, the inward movement of the tapered ring 15 urges the entire road arm inwardly of the shaft 3 for realizing the wedge-like function of the second tapered ring 16. This function is achieved by the fact that the second ring 16 is held securely against the shoulder 17 during inward motion of the road arm. By tightening the bolts 22, therefore, the road arm is not only directed inwardly of the shaft 3 but is also urged by the tapered rings 15–16 to be radially separated from the extremities of the splined or serrated surface 8.

The result of the structure set forth in FIGURE 3 is to substantially eliminate the undesirable consequences of the repeated application of non-rotary producing torque. In effect, the compression necessarily experienced between the road arm 1 and the horizontal shaft 3 is absorbed by the tapered conical rings in conjunction with the associated tapered recesses 15 and 16 and the shaft faces 11 and 12. These ring surfaces, having a substantially increased contact area relative to the contact area provided by the adjacent spline or serration, can successfully sustain all anticipated torque derived from the operation of the tank or tractor in its intended environment. This assembly, therefore, may be described as having the capacity for sustaining torque and moment which are non-coplanar, referring to rotary and non-rotary producing torque developed by perpendicular force components.

In addition to the ability of this shaft arm assembly to sustain non-coplanar torque and moment, this structure has the highly favorable characteristic of being radially separable by ordinary mechanics tools. For instance, past attempts at compensating for these non-coplanar forces have usually provided for a large interference fit between the shaft and cooperating arm. The joining of these members with a large interference required both the heating and expanding of the arm 1 and the cooling and shrinking of the shaft 3. Such a union, however, was for all purposes an essentially inseparable one, and the parts could not be removed or examined under ordinary field circumstances. In this invention, the splined or serrated surfaces may be fitted line on line which is a common designation for zero interference to a light interference. The result is that the road arm 1 may be removed from the shaft 3 by a standard wheel puller or the like. In this way, repairs or inspection can be readily had without sacrificing the protection required for the splined or serrated surfaces.

An alternate embodiment of this invention is shown in FIGURE 4 and comprises generally a shaft and arm assembly having rectangular cylindrical rings 23 and 24 disposed within complementary grooves 25 and 26. The rings 23 and 24 are fitted against smooth circumferential surfaces 27 and 28 disposed at the shaft 3 adjacent to the spline or serration 8. The closure plate 20 will similarly be bolted to the shaft 3 for causing the inner ring 24 to abut a shoulder 29 formed at a radially enlarged collar 30. This form of the invention may be utilized when less fixation is required between the splined or serrated surfaces and when ease of separation of the arm and cooperable shaft is highly desirable.

Similar to the embodiment shown in FIGURE 4, a second alternate embodiment is illustrated in FIGURE 5 and comprises essentially a shaft 3 having an integrally formed, radially enlarged collar 31. The collar 31 is received within a complementary groove 32 disposed circumferentially adjacent to the splined or serrated surface 8 and which is similar to the groove 26 shown in FIGURE 4. In this example, the collar 31 itself arts as a shoulder 33 for limiting the inward movement of the road arm 1 on the shaft. 3 This embodiment, therefore, eliminates the need for the cylindrical ring 24 shown at FIGURE 4 by substituting a portion of the shaft itself. This embodiment may be employed in situations where replacement of the associated rings would be considered highly unlikely. The rings of FIGURE 4 for instance may be replaced by larger diameter rings to increase the fixation between the splined or serrated surfaces for accommodating either excessive wear of the respective members or changed operating conditions.

It will be understood that various modifications may be suggested by the embodiment disclosed, but I desire to claim within the scope of patent warranted hereon all such modifications as come within the scope of my invention.

I claim as my invention:
1. A torque transmittal assembly comprising:
   a shaft mounted for rotation and having an end face,
   an arm having a bore formed therein for receiving said shaft,
   cooperable surfaces at the exterior of said shaft and interior of said bore for preventing substantial rotational motion of said arm relative to said shaft, said cooperable surfaces having a generally non-interference fit,
   a shoulder formed circumferentially of said shaft,
   a first circumferential groove formed at internally at a first end of said bore,
   a first cylindrical ring disposed within said first circumferential groove and abutting said shoulder,
   a second circumferential groove formed internally at a second end of said bore,
   a second cylindrical ring disposed within said second circumferential groove and extending beyond said end face of said shaft, said cooperable surfaces being located axially on said shaft between said first and second circumferential grooves, said first and second cylindrical rings absorbing substantially all the bending moment resulting from a component of force applied to said arm parallel to said shaft, a locking plate secured to said shaft and spaced from said end face at said second end of said bore and overlapping said second cylindrical ring, and means for tightening said locking plate toward said end face of said shaft thereby causing a force on said second cylindrical ring in the direction of said first circumferential groove which is opposed by a substantially equal and opposite force exerted by said shoulder on said first cylindrical ring in the direction of said first circumferential groove.

2. A torque transmitting assembly in accordance with claim 1 wherein at least one of said cylindrical rings comprises a tapered conical ring.

3. A torque transmitting assembly in accordance with claim 1 wherein said first and second cylindrical rings comprise tapered conical rings and wherein said first and second circumferential grooves comprise tapered grooves conforming substantially to the configuration of said tapered conical rings.

References Cited

UNITED STATES PATENTS

| 1,288,136 | 1918 | Neuteboom | 287—53 |
| 2,317,070 | 1943 | Le Tourneau | 287—53 |
| 2,899,222 | 1959 | Ross | 287—53 |
| 2,998,988 | 8/1961 | Barrett | 287—53 |
| 3,033,597 | 5/1962 | Miller | 287—53 |

FOREIGN PATENTS 823,384  12/1951  Germany.

CARL W. TOMLIN, *Primary Examiner.*

W. L. SHEDD, *Assistant Examiner.*